(12) United States Patent
Zhou et al.

(10) Patent No.: US 11,791,107 B2
(45) Date of Patent: Oct. 17, 2023

(54) HIERARCHICAL VOLTAGE CONTROL SYSTEM OF MULTI-ENERGY COMPLEMENTARY HYBRID ENERGY STORAGE SYSTEM AND ENERGY MANAGEMENT METHOD

(71) Applicant: INSTITUTE OF AUTOMATION, SHANDONG ACADEMY OF SCIENCES, Shandong (CN)

(72) Inventors: Guangxu Zhou, Shandong (CN); Dongdong Hou, Shandong (CN); Mengmei Zhu, Shandong (CN); Ningran Song, Shandong (CN); Yuan Liu, Shandong (CN); Jia Gao, Shandong (CN); Yongyun Mu, Shandong (CN); Kun Guo, Shandong (CN)

(73) Assignee: INSTITUTE OF AUTOMATION, SHANDONG ACADEMY OF SCIENCES, Shandong (CN)

( * ) Notice: Subject to any disclaimer, the term of this patent is extended or adjusted under 35 U.S.C. 154(b) by 569 days.

(21) Appl. No.: 17/056,764

(22) PCT Filed: Apr. 29, 2020

(86) PCT No.: PCT/CN2020/087638
§ 371 (c)(1),
(2) Date: Nov. 19, 2020

(87) PCT Pub. No.: WO2021/000643
PCT Pub. Date: Jan. 7, 2021

(65) Prior Publication Data
US 2021/0175025 A1    Jun. 10, 2021

(30) Foreign Application Priority Data
Jul. 1, 2019    (CN) .......................... 201910591802.7

(51) Int. Cl.
H01G 11/08    (2013.01)
H01M 10/052    (2010.01)
H02J 7/34    (2006.01)

(52) U.S. Cl.
CPC .......... H01G 11/08 (2013.01); H01M 10/052 (2013.01); H02J 7/345 (2013.01)

(58) Field of Classification Search
USPC ....................................................... 320/166
See application file for complete search history.

(56) References Cited

U.S. PATENT DOCUMENTS

| | | | | |
|---|---|---|---|---|
| 2011/0174561 A1* | 7/2011 | Bowman | ............. | B60L 15/2009 180/65.245 |
| 2016/0109916 A1* | 4/2016 | Li | ............. | H02J 7/35 700/295 |
| 2016/0176305 A1* | 6/2016 | James | ............. | H02J 3/38 307/26 |

FOREIGN PATENT DOCUMENTS

| | | |
|---|---|---|
| CN | 106208113 | 12/2016 |
| CN | 106329572 | 1/2017 |

(Continued)

OTHER PUBLICATIONS

Meng Runquan et al., "Hybrid Energy Storage Control and System Hierarchical Coordinated Control Strategy for DC Microgrids", High Voltage Engineering, Jul. 31, 2015, pp. 2186-2193.

(Continued)

*Primary Examiner* — Mohammed Alam
(74) *Attorney, Agent, or Firm* — JCIP GLOBAL INC.

(57) ABSTRACT

A hierarchical voltage control system is provided. A supercapacitor unit and a lithium battery unit are both connected to a DC bus to form a parallel-structure-type hybrid energy storage system, and are each configured with a power device and a switch to control a connection relationship between the corresponding unit and the DC bus. A detection circuit (Continued)

detects current and voltage values of the supercapacitor unit, the lithium battery unit, and the DC bus, detects an operating parameter of a power conversion system, and transmits the operating parameter to a processor, the power conversion system being connected in parallel to the DC bus for bidirectional power conversion of AC and DC energy sources. A microprocessor determines a system operating condition and uses a hierarchical voltage control strategy to control charging and discharging states of the supercapacitor unit and the lithium battery unit.

20 Claims, 3 Drawing Sheets

(56) References Cited

FOREIGN PATENT DOCUMENTS

| | | | | |
|---|---|---|---|---|
| CN | 106899029 | | 6/2017 | |
| CN | 110350559 | | 10/2019 | |
| CN | 110350559 B | * | 6/2021 | ............. H01G 11/08 |

OTHER PUBLICATIONS

"International Search Report (Form PCT/ISA/210) of PCT/CN2020/087638," dated Jul. 6, 2020, with English translation thereof, pp. 1-8.

* cited by examiner

FIG. 3

HIERARCHICAL VOLTAGE CONTROL SYSTEM OF MULTI-ENERGY COMPLEMENTARY HYBRID ENERGY STORAGE SYSTEM AND ENERGY MANAGEMENT METHOD

CROSS-REFERENCE TO RELATED APPLICATION

This application is a 371 of international application of PCT application serial no. PCT/CN2020/087638, filed on Apr. 29, 2020, which claims the priority benefits of China Patent Application No. 201910591802.7, filed on Jul. 1, 2019. The entirety of each of the above mentioned patent applications is hereby incorporated by reference herein and made a part of this specification.

BACKGROUND

Technical Field

The present disclosure belongs to the field of new energy power generation, and in particular, to a hierarchical voltage control system of a multi-energy complementary hybrid energy storage system and an energy management method.

Related Art

The description in this section merely provides background information related to the present disclosure and does not necessarily constitute the prior art.

A photovoltaic wind power of a distributed AC-DC microgrid is connected to a DC bus through DC-DC conversion (DC/DC) circuit or a rectifier circuit, and works in the maximum power point tracking (MPPT) mode. An output power varies with the fluctuation of illumination and wind power, which may result in fluctuations in the DC bus. According to understanding of the inventor, a part of the existing energy storage system is composed of a single lithium battery, of which charging and discharging rates are bound to fluctuate continuously, which will seriously affect the life of the lithium battery. In a common DC bus microgrid system involving a plurality of types of energy storage systems, an energy storage unit, such as a super capacitor and a lithium battery, is mostly connected to the DC bus through DC/DC. Due to the commutation characteristics of inductance in DC/DC, seamless and off-grid switching cannot be achieved for the microgrid.

The existing control method generally cannot solve the damage caused by frequent charging of an energy storage device, and cannot control a working state of each interface converter according to a change of the DC bus voltage, and automatically switch the working state of the energy storage device, to implement orderly charging and discharging of the energy storage device. Currently, power balance in the microgrid cannot be ensured to maintain stability of the AC/DC bus voltage.

SUMMARY

In order to solve the above problems, the present disclosure proposes a hierarchical voltage control system of a multi-energy complementary hybrid energy storage system and an energy management method. According to the present disclosure, a DC bus voltage can be adjusted, and system energy and power can be balanced.

According to some embodiments, the present disclose adopts the following technical solutions.

A hierarchical voltage control system of a multi-energy complementary hybrid energy storage system includes: a supercapacitor unit, a lithium battery unit, a power conversion system, a detection circuit, and a processor, wherein:
 the supercapacitor unit and the lithium battery unit are both connected to a DC bus to form a parallel-structure-type hybrid energy storage system, and the supercapacitor unit and the lithium battery unit are each configured with a power device and a switch to control a connection relationship with the DC bus according to a charging or discharging state of the corresponding unit;
 the detection circuit detects current and voltage values of the supercapacitor unit, the lithium battery unit and the DC bus, detects an operating parameter of the power conversion system, and transmits the operating parameter to the processor, the power conversion system being connected in parallel to the DC bus for bidirectional power conversion of AC and DC energy sources; and
 the processor determines a system operating condition according to a relationship between a voltage of the supercapacitor unit and a voltage of the lithium battery unit that are collected, and uses a hierarchical voltage control strategy to control charging and discharging states of the supercapacitor unit and the lithium battery unit.

The above technical solutions can make full use of the advantage of high energy density of lithium batteries, but have the disadvantage of low power density, limited cycle life, and slow dynamic response. The supercapacitor has obvious advantages such as a fast response speed, high power density, and low operating requirements, can provide or absorb a larger amount of energy in an instant, can control a working state of each interface converter according to a change of the DC bus voltage, and can automatically switch the working state of an energy storage device, to implement orderly charging and discharging of the energy storage device, thereby ensuring power balance in the microgrid to maintain voltage stability of the AC/DC bus.

In a possible embodiment, the supercapacitor unit includes a supercapacitor bank, a power device, and a switch, a positive terminal of the supercapacitor bank being connected to a positive terminal DC+ of the DC bus through the power device and the switch that are connected in series, the power device being connected in parallel to a diode connected inversely, and a negative terminal of the supercapacitor bank being connected to a negative terminal DC− of the DC bus.

In a possible embodiment, the lithium battery unit includes a lithium battery pack, a power device, and a switch, a positive terminal of the lithium battery pack being connected to a positive terminal DC+ of the DC bus through the power device and the switch that are connected in series, the power device being connected in parallel to a diode connected inversely, and a negative terminal of the lithium battery being connected to a negative terminal DC− of the DC bus.

In a possible embodiment, the processor is connected to and controls the power devices and switches of the lithium battery unit and the supercapacitor unit through an isolation drive circuit.

The energy release management method for the system above includes the following steps:

determining whether the voltage of the supercapacitor unit is greater than the voltage of the DC bus, and whether the voltage of the super capacitor unit is greater than the voltage of the lithium battery unit, if the foregoing condition is satisfied, performing next step, and if not, issuing an alarm;

turning off the power devices of the supercapacitor unit and the lithium battery unit; closing the switch of the supercapacitor unit; opening the switch of the lithium battery unit, so that the supercapacitor unit discharges;

in an energy release process of the supercapacitor bank, obtaining and calculating a discharge amount of the supercapacitor bank, determining whether a discharge amount of the supercapacitor is greater than or equal to a set discharge threshold, if the discharge amount exceeds the set threshold, performing next step, and otherwise performing this step; and turning off the power devices of the supercapacitor unit and the lithium battery unit; and closing the switches of the supercapacitor unit and the lithium battery unit, so that the supercapacitor unit discharges, the lithium battery unit discharges, and the lithium battery unit and the supercapacitor unit release energy simultaneously.

In a possible embodiment, the method further includes: in the energy release process, obtaining and calculating discharge amounts of the supercapacitor unit and the lithium battery unit through a detection circuit, determining whether a discharge amount of the supercapacitor is greater than or equal to a set threshold, if the discharge amount exceeds the set threshold, performing next step, and otherwise performing this step; and turning off the power devices of the supercapacitor unit and the lithium battery unit; and opening the switch of the supercapacitor unit, and closing the switch of the lithium battery unit, so that discharging of the supercapacitor unit ends, and the lithium battery unit continues discharging.

In a possible embodiment, the method further includes: in the energy release process, obtaining and calculating a discharge amount of the lithium battery unit, determining the discharge amount of the lithium battery unit being greater than or equal to the set threshold, if the discharge amount exceeds the set threshold, performing next step, and otherwise performing this step; and turning off the power devices of the supercapacitor unit and the lithium battery unit; and opening the switches of the supercapacitor unit and the lithium battery unit, so that the energy release process is completed.

The energy storage management method for the system above includes the following steps:

determining whether the voltage of the supercapacitor unit is less than the voltage of the DC bus, and whether the voltage of the lithium battery pack is less than the voltage of the supercapacitor unit, if the foregoing condition is satisfied, performing next step, and if not, issuing an alarm;

turning off the power device of the supercapacitor unit, turning on the power device of the lithium battery unit, opening the switch of the supercapacitor unit, and closing the switch of the lithium battery unit; charging the lithium battery unit through the power conversion system;

in a process of charging the lithium battery unit, obtaining and calculating a charge amount of the lithium battery unit, determining whether the charge amount of the lithium battery unit is greater than or equal to a set charging threshold, if the charge amount exceeds the set threshold, performing next step, and otherwise performing this step; and turning on the power devices of the supercapacitor unit and the lithium battery unit, closing the switches of the supercapacitor unit and the lithium battery unit, and simultaneously charging the lithium battery unit and the supercapacitor unit through a power conversion system.

In a possible embodiment, the method further includes: in the energy storage process, obtaining and calculating charge amounts of the supercapacitor unit and the lithium battery unit, determining whether a charge amount of the lithium battery unit is greater than or equal to the set threshold, if the charge amount exceeds the set threshold, performing next step, and otherwise performing this step; and turning on the power device of the supercapacitor unit, turning off the power device of the lithium battery unit, closing the switch of the supercapacitor unit, and opening the switch of the lithium battery unit, so that charging of the lithium battery unit ends, and the supercapacitor unit is continuously charged through the power conversion system.

In a possible embodiment, the method further includes: in the energy storage process, obtaining and calculating the charge amount of the supercapacitor unit, determining whether a charge amount of the supercapacitor is greater than or equal to the set threshold, if the charge amount exceeds the set threshold, performing next step, and otherwise performing this step; and turning off the power devices of the supercapacitor unit and the lithium battery unit, and opening the switches of the supercapacitor unit and the lithium battery unit, so that the energy storage process is completed.

A computer readable storage medium is provided, storing a plurality of instructions, the instructions being adapted to be loaded by a processor of a terminal device and perform the energy management method.

A terminal device is provided, including a processor and a computer readable storage medium, the processor being configured to implement instructions; the computer readable storage medium being configured to store a plurality of instructions, the instructions being adapted to be loaded by a processor and perform the management method.

Compared to the prior art, the present disclosure has the following beneficial effects.

(1) The energy storage system can give full play to the various advantages of the lithium battery and the supercapacitor. The lithium battery can provide long-term power supply, and the supercapacitor can provide fast energy supply, so that power balance in the microgrid can be achieved, and voltages of the AC and DC bus are stable, which indicates that the proposed method is simple and effective.

(2) A topology of a circuit is simple to avoid high switching frequency of key devices and prolong its life.

(3) The supercapacitor and the lithium battery are connected to the DC bus through a semiconductor switch without DC/DC, so that seamless and off-grid switching is implemented as required by the microgrid.

(4) The supercapacitor and the lithium battery system work at stagger times in voltage segments. The supercapacitor responds to shocks and instability of photovoltaic wind power, as well as instantaneous load impacts, and the lithium battery system provides long-term load support.

(5) Whether the supercapacitor and the lithium battery need to overlap, the degree of overlapping can be achieved by adjusting the set threshold according to the actual situation. The adjustment method is simple and convenient.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

DETAILED DESCRIPTION

The present disclosure is further described below with reference to the accompanying drawings and embodiments.

It should be noted that the following detailed descriptions are all exemplary and are intended to provide a further description of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

A hierarchical voltage control apparatus of a multi-energy complementary hybrid energy storage system (HESS) and a power management method are provided. A hybrid energy storage system is composed of a lithium battery pack and a supercapacitor bank with strong complementary performance, which is specific to the advantage of high energy density of lithium batteries and the disadvantage of low power density, limited cycle life, slow dynamic response, and the like. The supercapacitor has obvious advantages such as a fast response speed, high power density, and low operation requirements, and can provide or absorb a larger amount of energy in an instant. The hybrid energy storage system control strategy of an AC and DC microgrid proposed by using a simple and effective control circuit, a detection circuit, and a microprocessor plays the role of adjusting a DC bus voltage and balancing the energy and power of the system.

In order to achieve the above objective, the present invention adopts the following technical solutions.

Figure 1:
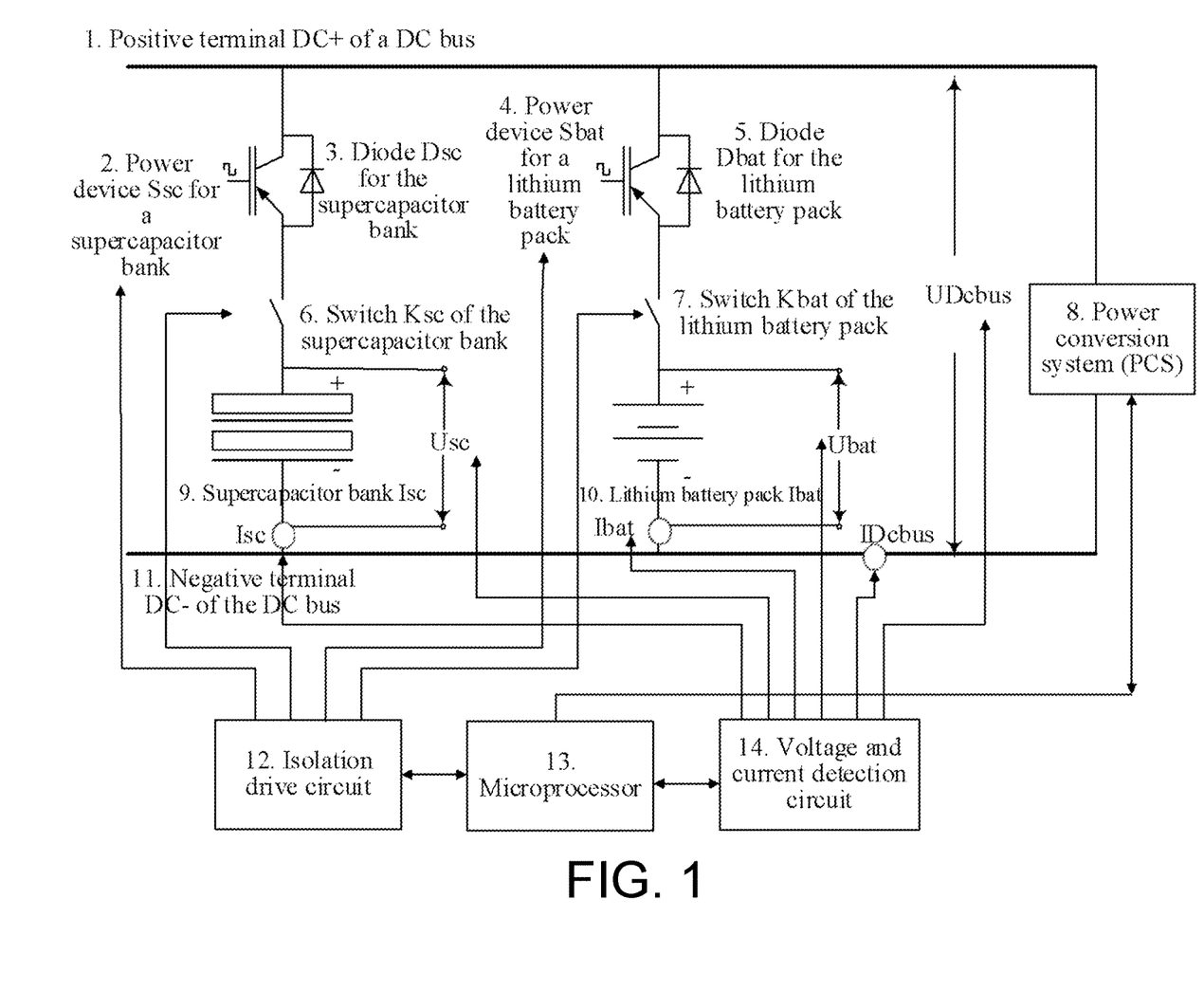
FIG. 1 is a diagram of a hybrid energy storage system according to an embodiment.

As shown in FIG. 1, a hierarchical voltage control apparatus for hybrid energy storage system includes: 1. Positive terminal DC+ of a DC bus; 2. Power device Ssc for a supercapacitor bank, which can actively control turn-on and turn-off of an IGBT; 3. Diode Dsc for the supercapacitor bank; 4. Power device Sbat for a lithium battery pack, which can actively control turn-on and turn-off of an IGBT; 5. Diode Dbat for the lithium battery pack; 6. Switch of the supercapacitor bank, Ksc being a switch that controls the supercapacitor; 7. Switch of the lithium battery pack, Kbat being a switch that controls a lithium iron phosphate system; 8. Power conversion system (PCS); 9. Supercapacitor bank; 10. Lithium battery pack; 11. Negative terminal DC− of the DC bus; 12. Isolation drive circuit; 13. Microprocessor; 14. Voltage and circuit detection circuit.

The positive terminal of the supercapacitor bank is connected to the positive terminal DC+ of the DC bus through the power device Ssc for the supercapacitor bank, the diode Dsc for the supercapacitor bank, and the switch of the supercapacitor bank. The negative terminal of the supercapacitor bank is connected to the negative terminal DC− of the DC bus.

The positive terminal of the lithium battery pack is connected to the positive terminal DC+ of the DC bus through the power device Sbat for the lithium battery pack, the diode Dbat for the lithium battery pack, and the switch of the lithium battery pack. The negative terminal of the lithium battery pack is connected to the negative terminal DC− of the DC bus.

The supercapacitor bank and the lithium battery pack form a parallel-structure-type hybrid energy storage system, which implements effective control of the HESS system by collecting the DC bus voltage and current, a voltage at a terminal of the supercapacitor and an output current of the supercapacitor, and a voltage and an output current at a terminal of the lithium battery. The power conversion system (PCS) can implement power conversion of AC and DC energy sources in the AC and DC microgrid system.

The isolation drive circuit can implement the isolation between the microprocessor and a switching device and the drive control of the switching device.

The microprocessor implements external signal processing, hierarchical voltage control, and the energy management strategy.

The voltage and current detection circuit implements the collection and processing of the voltages and currents of the DC bus, the lithium battery pack, and the supercapacitor bank in the system.

The energy management strategy for the hierarchical voltage control includes the following steps.

Figure 2:
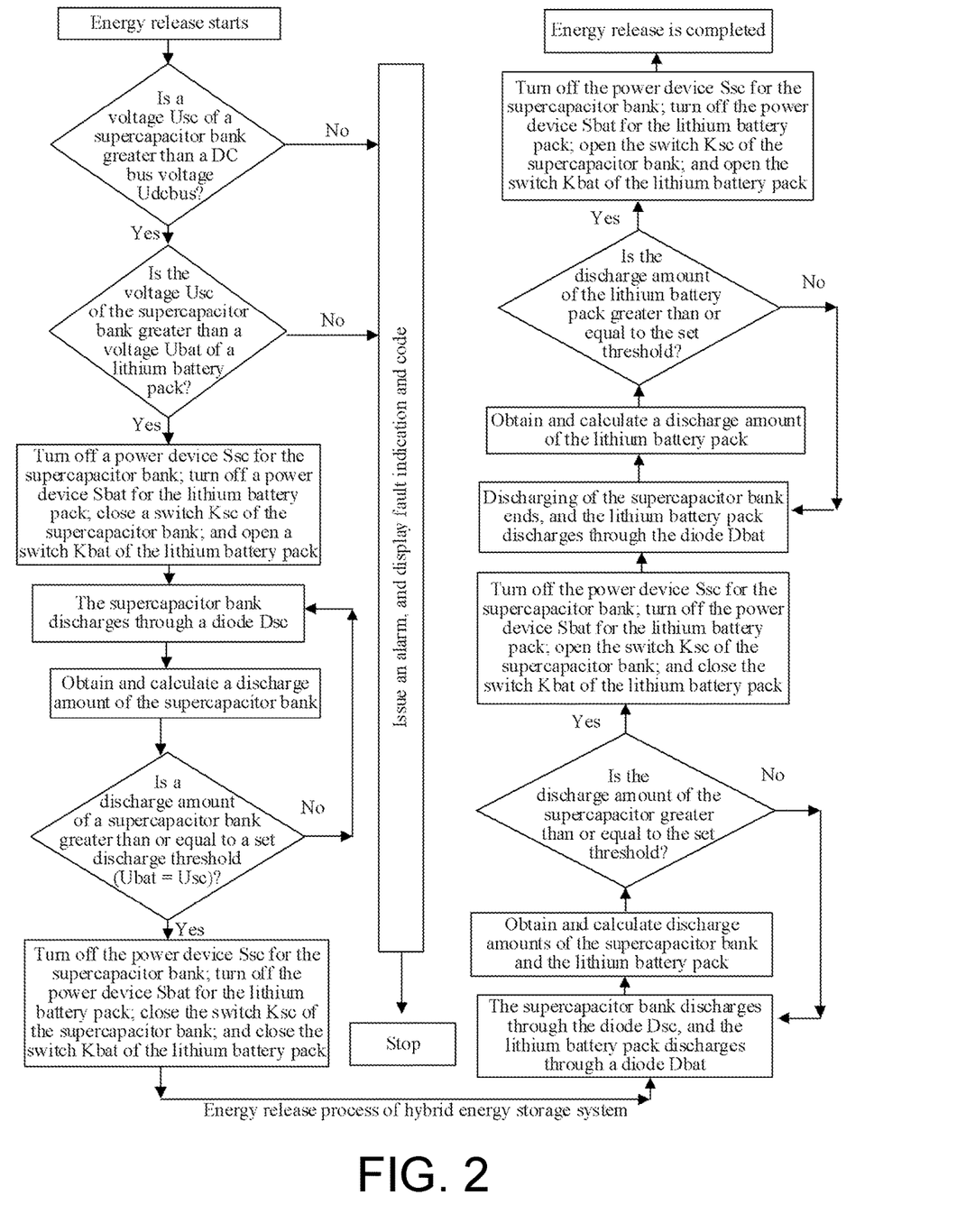
FIG. 2 is a flowchart of energy release through a hierarchical voltage control strategy according to an embodiment.

As shown in FIG. 2, an energy release mode management strategy is provided, including the following steps:

Step 1: At the start of energy release, first determine whether a voltage Usc of a supercapacitor bank is greater than a voltage UDcbus of a DC bus, and whether the voltage Usc of the supercapacitor unit is greater than a voltage Ubat of a lithium battery pack, if the foregoing condition is satisfied, perform next step, and if not, issue an alarm.

Step 2: Turn off a power device Ssc for the supercapacitor bank; turn off a power device Sbat for the lithium battery pack; close a switch Ksc of the supercapacitor bank; and open a switch Kbat of the lithium battery pack, so that the supercapacitor bank discharges through a diode Dsc.

Step 3: In an energy release process of the supercapacitor bank, obtain and calculate a battery level released by the supercapacitor bank, determine whether a discharge amount of the supercapacitor is greater than or equal to a set discharge threshold, if the discharge amount exceeds the set threshold, perform next step, and otherwise perform this step.

Step 4: Turn off a power device Ssc for the supercapacitor bank; turn off a power device Sbat for the lithium battery pack; close a switch Ksc of the supercapacitor bank; and close a switch Kbat of the lithium battery pack, so that the supercapacitor bank discharges through a diode Dsc, the lithium battery pack discharges through a diode Dbat, and the lithium battery pack and the supercapacitor bank simultaneously release energy.

Step 5: In the energy release process, obtain and calculate discharge amounts of the two through a detection circuit, if the discharge amount of the supercapacitor exceeds the set threshold, perform next step, and otherwise perform this step.

Step 6: Turn off a power device Ssc for the supercapacitor bank; turn off a power device Sbat for the lithium battery pack; open a switch Ksc of the supercapacitor bank; and close a switch Kbat of the lithium battery pack, so that discharging of the supercapacitor bank ends, and the lithium battery pack continues discharging through the diode Dbat.

Step 7: In the energy release process, obtain and calculate a discharge amount of the lithium battery pack, if the discharge amount of the lithium battery pack exceeds the set threshold, perform next step, and otherwise perform this step.

Step 8: Turn off a power device Ssc for the supercapacitor bank; turn off a power device Sbat for the lithium battery pack; open a switch Ksc of the supercapacitor bank; and open a switch Kbat of the lithium battery pack, so that the energy release process is completed.

Figure 3:
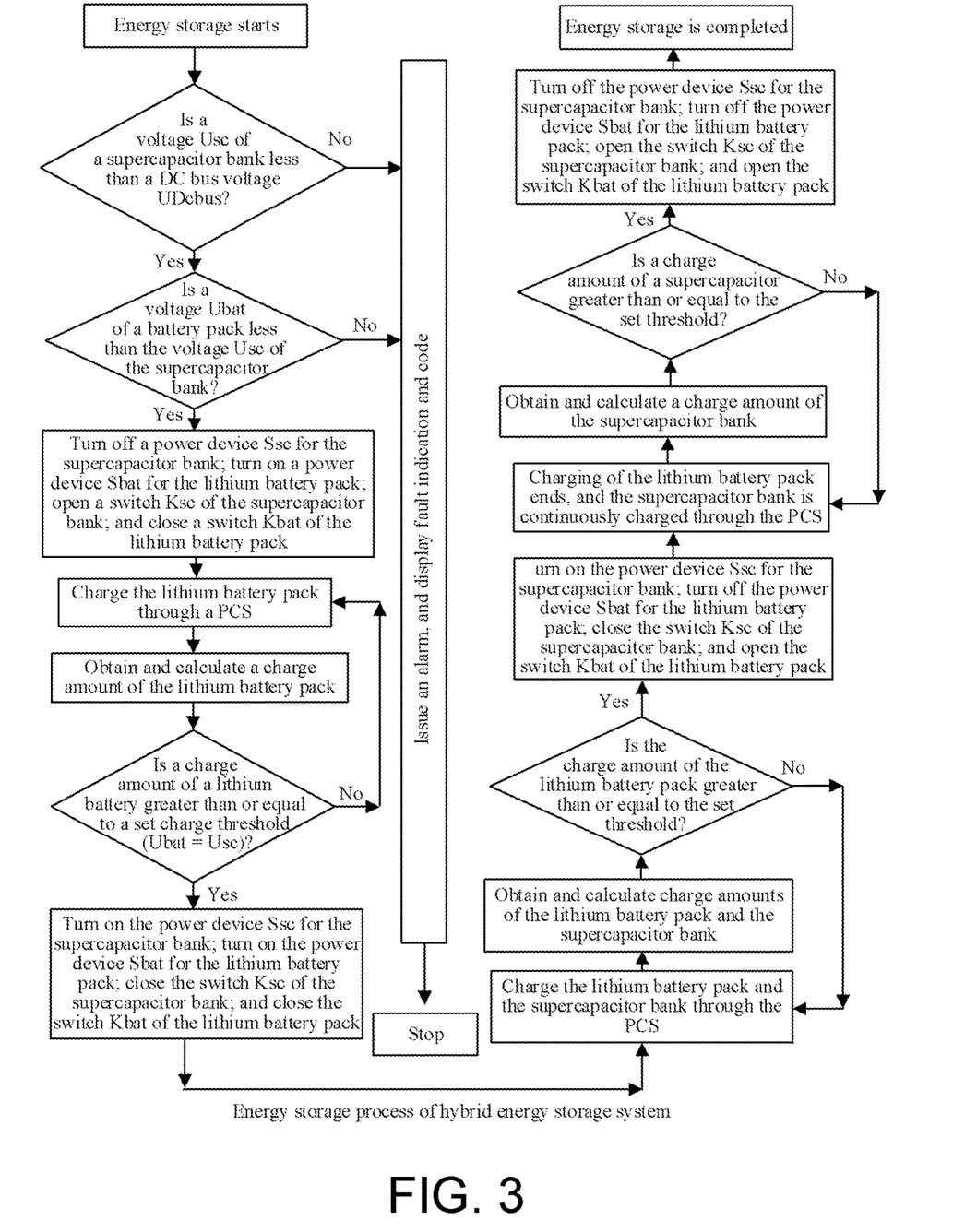
FIG. 3 is a flowchart of energy storage through a hierarchical voltage control strategy according to an embodiment.

As shown in FIG. 3, a management strategy for an energy storage mode is provided, including the following steps.

Step 1: At the start of energy storage, first determine whether a voltage Usc of a supercapacitor bank is less than a voltage UDcbus of a DC bus, and whether a voltage of a lithium battery pack is less than the voltage Usc of the supercapacitor bank, if the foregoing condition is satisfied, perform next step, and if not, issue an alarm.

Step 2: Turn off a power device Ssc for the supercapacitor bank; turn on a power device Sbat for the lithium battery pack; open a switch Ksc of the supercapacitor bank; close a switch Kbat of the lithium battery pack; and charging the lithium battery pack through a power conversion system (PCS).

Step 3: In a process of charging the lithium battery pack, obtain and calculate a charge amount of the lithium battery pack, if the charge amount of the lithium battery pack exceeds the set threshold, perform next step, and otherwise perform this step.

Step 4: Turn on a power device Ssc for the supercapacitor bank; turn on a power device Sbat for the lithium battery pack; close a switch Ksc of the supercapacitor bank; close a switch Kbat of the lithium battery pack; and simultaneously charge the lithium battery pack and the supercapacitor bank through a power conversion system (PCS).

Step 5: In the energy storage process, obtain and calculate charge amounts of the supercapacitor bank and the lithium battery pack, if the charge amount of the lithium battery pack exceeds the set threshold, perform next step, and otherwise perform this step.

Step 6: Turn on a power device Ssc for the supercapacitor bank; turn off a power device Sbat for the lithium battery pack; close a switch Ksc of the supercapacitor bank; and open a switch Kbat of the lithium battery pack, so that charging the lithium battery pack ends, and the supercapacitor bank is continuously charged through a power conversion system (PCS).

Step 7: In the energy storage process, obtain and calculate the charge amount of the supercapacitor bank, if the charge amount of the supercapacitor exceeds the set threshold, perform next step, and otherwise perform this step.

Step 8: Turn off a power device Ssc for the supercapacitor bank; turn off a power device Sbat for the lithium battery pack; open a switch Ksc of the supercapacitor bank; and open a switch Kbat of the lithium battery pack, so that energy storage is completed.

A person skilled in the art should understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product implemented on one or more computer available storage media (including but not limited to a disk memory, a CD-ROM, an optical memory, and the like) including computer available program code.

The present disclosure is described with reference to flowcharts and/or block diagrams of the method, device (system), and computer program product in the embodiments of the present disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by a computer or a processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

The foregoing descriptions are merely exemplary embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A hierarchical voltage control system of a multi-energy complementary hybrid energy storage system, comprising: a supercapacitor unit, a lithium battery unit, a power conversion system, a detection circuit, and a processor, wherein the supercapacitor unit and the lithium battery unit are both connected to a DC bus to form a parallel-structure-type hybrid energy storage system, and the supercapacitor unit and the lithium battery unit are each configured with a power device and a switch to control a connection relationship with the DC bus according to a charging or discharging state of the corresponding unit;

the detection circuit detects current and voltage values of the supercapacitor unit, the lithium battery unit, and the DC bus, detects an operating parameter of the power conversion system, and transmits the operating parameter to the processor, the power conversion system being connected in parallel to the DC bus for bidirectional power conversion of AC and DC energy sources; and the processor determines a system operating condition according to a relationship between a voltage of the supercapacitor unit and a voltage of the lithium battery unit that are collected, and uses a hierarchical voltage control strategy to control charging and discharging states of the supercapacitor unit and the lithium battery unit.

2. The hierarchical voltage control system of a multi-energy complementary hybrid energy storage system according to claim 1, wherein the supercapacitor unit comprises a supercapacitor bank, the power device, and the switch, a positive terminal of the supercapacitor bank being connected to a positive terminal DC+ of the DC bus through the power device and the switch that are connected in series, the power device being connected in parallel to a diode connected inversely, and a negative terminal of the supercapacitor bank being connected to a negative terminal DC− of the DC bus.

3. The hierarchical voltage control system of a multi-energy complementary hybrid energy storage system according to claim 1, wherein the lithium battery unit comprises a lithium battery pack, the power device, and the switch, a positive terminal of the lithium battery pack being connected to a positive terminal DC+ of the DC bus through the power device and the switch that are connected in series, the power device being connected in parallel to a diode connected inversely, and a negative terminal of the lithium battery pack being connected to a negative terminal DC− of the DC bus.

4. The hierarchical voltage control system of a multi-energy complementary hybrid energy storage system according to claim 1, wherein the processor is connected to and controls the power devices and switches of the lithium battery unit and the supercapacitor unit through an isolation drive circuit.

5. An energy release management method for a hierarchical voltage control system of a multi-energy complementary hybrid energy storage system, comprising: a supercapacitor unit, a lithium battery unit, a power conversion system, a detection circuit, and a processor, wherein the supercapacitor unit and the lithium battery unit are both connected to a DC bus to form a parallel-structure-type hybrid energy storage system, and the supercapacitor unit and the lithium battery unit are each configured with a power device and a switch to control a connection relationship with the DC bus according to a charging or discharging state of the corresponding unit; the detection circuit detects current and voltage values of the supercapacitor unit, the lithium battery unit, and the DC bus, detects an operating parameter of the power conversion system, and transmits the operating parameter to the processor, the power conversion system being connected in parallel to the DC bus for bidirectional power conversion of AC and DC energy sources; and the processor determines a system operating condition according to a relationship between a voltage of the supercapacitor unit and a voltage of the lithium battery unit that are collected, and uses a hierarchical voltage control strategy to control charging and discharging states of the supercapacitor unit and the lithium battery unit, comprising the following steps:

determining whether the voltage of the supercapacitor unit is greater than the voltage of the DC bus, and whether the voltage of the supercapacitor unit is greater than the voltage of the lithium battery unit, if the foregoing condition is satisfied, performing next step, and if not, issuing an alarm;

turning off the power devices of the supercapacitor unit and the lithium battery unit; closing the switch of the supercapacitor unit; opening the switch of the lithium battery unit, so that the supercapacitor unit discharges;

in an energy release process of the supercapacitor unit, obtaining and calculating a discharge amount of the supercapacitor unit, determining whether the discharge amount of the supercapacitor unit is greater than or equal to a set threshold of discharging, if the discharge amount exceeds the set threshold, performing next step, and otherwise continuing this step; and turning off the power devices of the supercapacitor unit and the lithium battery unit, and closing the switches of the supercapacitor unit and the lithium battery unit, so that the supercapacitor unit discharges, the lithium battery unit discharges, and the lithium battery unit and the supercapacitor unit release energy simultaneously.

6. The energy release management method according to claim 5, wherein:

in the energy release process, obtaining and simultaneously calculating discharge amounts of the supercapacitor unit and the lithium battery unit through a detection circuit, determining whether the discharge amount of the supercapacitor is greater than or equal to the set threshold, if the discharge amount exceeds the set threshold, performing next step, and otherwise continuing this step;

turning off the power devices of the supercapacitor unit and the lithium battery unit; opening the switch of the supercapacitor unit, and closing the switch of the lithium battery unit, so that discharging of the supercapacitor unit ends, and the lithium battery unit continues discharging; or in the energy release process, obtaining and calculating the discharge amount of the lithium battery unit, determining whether the discharge amount of the lithium battery unit being greater than or equal to the set threshold, if the discharge amount exceeds the set threshold, performing next step, and otherwise continuing this step; and turning off the power devices of the supercapacitor unit and the lithium battery unit; and opening the switches of the supercapacitor unit and the lithium battery unit, so that the energy release process is completed.

7. An energy storage management method for a hierarchical voltage control system of a multi-energy complementary hybrid energy storage system, comprising: a supercapacitor unit, a lithium battery unit, a power conversion system, a detection circuit, and a processor, wherein the supercapacitor unit and the lithium battery unit are both connected to a DC bus to form a parallel-structure-type hybrid energy storage system, and the supercapacitor unit and the lithium battery unit are each configured with a power device and a switch to control a connection relationship with the DC bus according to a charging or discharging state of the corresponding unit; the detection circuit detects current and voltage values of the supercapacitor unit, the lithium battery unit, and the DC bus, detects an operating parameter of the power conversion system, and transmits the operating parameter to the processor, the power conversion system being connected in parallel to the DC bus for bidirectional power conversion of AC and DC energy sources; and the processor determines a system operating condition according to a relationship between a voltage of the supercapacitor unit and a voltage of the lithium battery unit that are collected, and uses a hierarchical voltage control strategy to control charging and discharging states of the supercapacitor unit and the lithium battery unit, comprising the following steps:
  determining whether the voltage of the supercapacitor unit is less than the voltage of the DC bus, and whether the voltage of the lithium battery unit is less than the voltage of the supercapacitor unit, if the foregoing condition is satisfied, performing next step, and if not, issuing an alarm;
  turning off the power device of the supercapacitor unit, turning on the power device of the lithium battery unit, opening the switch of the supercapacitor unit, and closing the switch of the lithium battery unit; and charging the lithium battery unit through the power conversion system;
  in an energy storage process of charging the lithium battery unit, obtaining and calculating a charge amount of the lithium battery unit, determining whether the charge amount of the lithium battery unit is greater than or equal to a set threshold of charging, if the charge amount exceeds the set threshold, performing next step, and otherwise continuing this step; and
  turning on the power devices of the supercapacitor unit and the lithium battery unit, closing the switches of the supercapacitor unit and the lithium battery unit, and simultaneously charging the lithium battery unit and the supercapacitor unit through the power conversion system.

8. The energy storage management method according to claim 7, wherein:
  in the energy storage process, obtaining and simultaneously calculating charge amounts of the supercapacitor unit and the lithium battery unit, determining whether the charge amount of the lithium battery unit is greater than or equal to the set threshold, if the charge amount exceeds the set threshold, performing next step, and otherwise continuing this step; and
  turning on the power device of the supercapacitor unit, turning off the power device of the lithium battery unit, closing the switch of the supercapacitor unit, and opening the switch of the lithium battery unit, so that charging of the lithium battery unit ends, and the supercapacitor unit is continuously charged through the power conversion system.

9. The energy storage management method according to claim 7, wherein:
  in the energy storage process, obtaining and calculating the charge amount of the supercapacitor unit, determining whether the charge amount of the supercapacitor is greater than or equal to the set threshold, if the charge amount exceeds the set threshold, performing next step, and otherwise continuing this step; and
  turning off the power devices of the supercapacitor unit and the lithium battery unit, and opening the switches of the supercapacitor unit and the lithium battery unit, so that the energy storage process is completed.

10. A non-transitory computer readable storage medium storing a plurality of instructions, the instructions being adapted to be loaded by a processor of a terminal device and perform the management method according to claim 5.

11. An energy release management method for the system according to claim 2, comprising the following steps:
  determining whether the voltage of the supercapacitor unit is greater than the voltage of the DC bus, and whether the voltage of the supercapacitor unit is greater than the voltage of the lithium battery unit, if the foregoing condition is satisfied, performing next step, and if not, issuing an alarm;
  turning off the power devices of the supercapacitor unit and the lithium battery unit; closing the switch of the supercapacitor unit; opening the switch of the lithium battery unit, so that the supercapacitor unit discharges;
  in an energy release process of the supercapacitor unit, obtaining and calculating a discharge amount of the supercapacitor unit, determining whether the discharge amount of the supercapacitor unit is greater than or equal to a set threshold of discharging, if the discharge amount exceeds the set threshold, performing next step, and otherwise continuing this step; and
  turning off the power devices of the supercapacitor unit and the lithium battery unit, and closing the switches of the supercapacitor unit and the lithium battery unit, so that the supercapacitor unit discharges, the lithium battery unit discharges, and the lithium battery unit and the supercapacitor unit release energy simultaneously.

12. An energy release management method for the system according to claim 3, comprising the following steps:
  determining whether the voltage of the supercapacitor unit is greater than the voltage of the DC bus, and whether the voltage of the supercapacitor unit is greater than the voltage of the lithium battery unit, if the foregoing condition is satisfied, performing next step, and if not, issuing an alarm;
  turning off the power devices of the supercapacitor unit and the lithium battery unit; closing the switch of the supercapacitor unit; opening the switch of the lithium battery unit, so that the supercapacitor unit discharges;
  in an energy release process of the supercapacitor unit, obtaining and calculating a discharge amount of the supercapacitor unit, determining whether the discharge amount of the supercapacitor unit is greater than or equal to a set threshold of discharging, if the discharge amount exceeds the set threshold, performing next step, and otherwise continuing this step; and
  turning off the power devices of the supercapacitor unit and the lithium battery unit, and closing the switches of the supercapacitor unit and the lithium battery unit, so that the supercapacitor unit discharges, the lithium battery unit discharges, and the lithium battery unit and the supercapacitor unit release energy simultaneously.

13. An energy release management method for the system according to claim 4, comprising the following steps:
- determining whether the voltage of the supercapacitor unit is greater than the voltage of the DC bus, and whether the voltage of the supercapacitor unit is greater than the voltage of the lithium battery unit, if the foregoing condition is satisfied, performing next step, and if not, issuing an alarm;
- turning off the power devices of the supercapacitor unit and the lithium battery unit; closing the switch of the supercapacitor unit; opening the switch of the lithium battery unit, so that the supercapacitor unit discharges;
- in an energy release process of the supercapacitor unit, obtaining and calculating a discharge amount of the supercapacitor unit, determining whether the discharge amount of the supercapacitor unit is greater than or equal to a set threshold of discharging, if the discharge amount exceeds the set threshold, performing next step, and otherwise continuing this step; and
- turning off the power devices of the supercapacitor unit and the lithium battery unit, and closing the switches of the supercapacitor unit and the lithium battery unit, so that the supercapacitor unit discharges, the lithium battery unit discharges, and the lithium battery unit and the supercapacitor unit release energy simultaneously.

14. An energy storage management method for the system according to claim 2, comprising the following steps:
- determining whether the voltage of the supercapacitor unit is less than the voltage of the DC bus, and whether the voltage of the lithium battery unit is less than the voltage of the supercapacitor unit, if the foregoing condition is satisfied, performing next step, and if not, issuing an alarm;
- turning off the power device of the supercapacitor unit, turning on the power device of the lithium battery unit, opening the switch of the supercapacitor unit, and closing the switch of the lithium battery unit; and charging the lithium battery unit through the power conversion system;
- in an energy storage process of charging the lithium battery unit, obtaining and calculating a charge amount of the lithium battery unit, determining whether the charge amount of the lithium battery unit is greater than or equal to a set threshold of charging, if the charge amount exceeds the set threshold, performing next step, and otherwise continuing this step; and
- turning on the power devices of the supercapacitor unit and the lithium battery unit, closing the switches of the supercapacitor unit and the lithium battery unit, and simultaneously charging the lithium battery unit and the supercapacitor unit through the power conversion system.

15. An energy storage management method for the system according to claim 3, comprising the following steps:
- determining whether the voltage of the supercapacitor unit is less than the voltage of the DC bus, and whether the voltage of the lithium battery unit is less than the voltage of the supercapacitor unit, if the foregoing condition is satisfied, performing next step, and if not, issuing an alarm;
- turning off the power device of the supercapacitor unit, turning on the power device of the lithium battery unit, opening the switch of the supercapacitor unit, and closing the switch of the lithium battery unit; and charging the lithium battery unit through the power conversion system;
- in an energy storage process of charging the lithium battery unit, obtaining and calculating a charge amount of the lithium battery unit, determining whether the charge amount of the lithium battery unit is greater than or equal to a set threshold of charging, if the charge amount exceeds the set threshold, performing next step, and otherwise continuing this step; and
- turning on the power devices of the supercapacitor unit and the lithium battery unit, closing the switches of the supercapacitor unit and the lithium battery unit, and simultaneously charging the lithium battery unit and the supercapacitor unit through the power conversion system.

16. An energy storage management method for the system according to claim 4, comprising the following steps:
- determining whether the voltage of the supercapacitor unit is less than the voltage of the DC bus, and whether the voltage of the lithium battery unit is less than the voltage of the supercapacitor unit, if the foregoing condition is satisfied, performing next step, and if not, issuing an alarm;
- turning off the power device of the supercapacitor unit, turning on the power device of the lithium battery unit, opening the switch of the supercapacitor unit, and closing the switch of the lithium battery unit; and charging the lithium battery unit through the power conversion system;
- in an energy storage process of charging the lithium battery unit, obtaining and calculating a charge amount of the lithium battery unit, determining whether the charge amount of the lithium battery unit is greater than or equal to a set threshold of charging, if the charge amount exceeds the set threshold, performing next step, and otherwise continuing this step; and
- turning on the power devices of the supercapacitor unit and the lithium battery unit, closing the switches of the supercapacitor unit and the lithium battery unit, and simultaneously charging the lithium battery unit and the supercapacitor unit through the power conversion system.

17. The energy storage management method according to claim 7, wherein:
- in the energy storage process, obtaining and calculating the charge amount of the supercapacitor unit, determining whether the charge amount of the supercapacitor is greater than or equal to the set threshold, if the charge amount exceeds the set threshold, performing next step, and otherwise continuing this step; and
- turning off the power devices of the supercapacitor unit and the lithium battery unit, and opening the switches of the supercapacitor unit and the lithium battery unit, so that the energy storage process is completed.

18. A non-transitory computer readable storage medium storing a plurality of instructions, the instructions being adapted to be loaded by a processor of a terminal device and perform the management method according to claim 6.

19. A non-transitory computer readable storage medium storing a plurality of instructions, the instructions being adapted to be loaded by a processor of a terminal device and perform the management method according to claim 7.

20. A non-transitory computer readable storage medium storing a plurality of instructions, the instructions being adapted to be loaded by a processor of a terminal device and perform the management method according to claim 8.

* * * * *